(12) United States Patent
Cho et al.

(10) Patent No.: US 9,731,709 B2
(45) Date of Patent: Aug. 15, 2017

(54) DRIVING SYSTEM FOR VEHICLE AND CONTROLLING METHOD THEREOF

(71) Applicant: Hyundai Motor Company, Seoul (KR)

(72) Inventors: Teh Hwan Cho, Gyeonggi-do (KR); Jungeol Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/938,521

(22) Filed: Nov. 11, 2015

(65) Prior Publication Data

US 2017/0015302 A1    Jan. 19, 2017

(30) Foreign Application Priority Data

Jul. 13, 2015    (KR) .................. 10-2015-0099197

(51) Int. Cl.

| | |
|---|---|
| *B60W 20/30* | (2016.01) |
| *B60W 10/02* | (2006.01) |
| *B60W 10/11* | (2012.01) |
| *B60W 10/08* | (2006.01) |
| *B60W 10/06* | (2006.01) |
| *B60W 30/18* | (2012.01) |
| *B60W 20/10* | (2016.01) |
| *B60K 6/48* | (2007.10) |

(52) U.S. Cl.

CPC .......... *B60W 20/30* (2013.01); *B60W 10/02* (2013.01); *B60W 10/06* (2013.01); *B60W 10/08* (2013.01); *B60W 10/11* (2013.01); *B60W 20/10* (2013.01); *B60W 30/18036* (2013.01); *B60K 2006/4825* (2013.01); *B60W 2510/0241* (2013.01); *B60W 2540/10* (2013.01); *B60W 2540/16* (2013.01); *B60W 2710/025* (2013.01); *B60W 2710/081* (2013.01); *B60W 2710/083* (2013.01); *Y10S 903/93* (2013.01); *Y10S 903/951* (2013.01)

(58) Field of Classification Search
CPC ......... B60W 20/30; B60W 10/02; B60K 6/48; B60K 6/365; F16H 61/14; F16H 61/66259

See application file for complete search history.

(56) References Cited

U.S. PATENT DOCUMENTS

| | | | |
|---|---|---|---|
| 7,670,257 B2 * | 3/2010 | Popp .................. | B60K 6/48 477/174 |
| 8,132,635 B2 * | 3/2012 | Fujimoto .............. | B60W 10/02 180/65.21 |

(Continued)

FOREIGN PATENT DOCUMENTS

| | | |
|---|---|---|
| JP | 2010-179858 A | 8/2010 |
| JP | 5715848 B2 | 5/2015 |
| KR | 10-2013-0011066 A | 1/2013 |

*Primary Examiner* — Yuri Kan

(74) *Attorney, Agent, or Firm* — Mintz Levin Cohn Ferris Glovsky and Popeo, P.C.; Peter F. Corless

(57) ABSTRACT

A driving system is provided for a vehicle that includes an engine, a driving motor connected to the engine and generating a driving force, and a transmission that receives a driving force generated from the driving motor and changes a direction of the driving force. Additionally, a clutch selectively connects between the driving motor and the transmission and a controller operates the driving motor and the transmission. The controller determines whether a direction inversion shifting condition is satisfied and performs a direction inversion shifting using the driving motor when the direction inversion shifting condition is satisfied.

12 Claims, 3 Drawing Sheets

(56) References Cited

U.S. PATENT DOCUMENTS

| | | | | |
|---|---|---|---|---|
| 2002/0123831 A1* | 9/2002 | Nakagawa | B60K 6/48 | 701/22 |
| 2006/0030449 A1* | 2/2006 | Tsukada | F16H 61/66259 | 477/3 |
| 2007/0080040 A1* | 4/2007 | Bader | F16D 25/088 | 192/85.51 |
| 2007/0205735 A1* | 9/2007 | Kiuchi | B60K 6/365 | 318/432 |
| 2008/0071437 A1* | 3/2008 | Hirata | B60K 6/48 | 701/22 |
| 2008/0228363 A1* | 9/2008 | Kouno | B60K 6/48 | 701/54 |
| 2008/0258474 A1* | 10/2008 | Tabata | B60K 6/365 | 290/40 A |
| 2009/0143950 A1* | 6/2009 | Hasegawa | B60K 6/48 | 701/68 |
| 2009/0205886 A1* | 8/2009 | Supina | B60K 6/365 | 180/65.22 |
| 2013/0297128 A1* | 11/2013 | Takamura | B60K 6/48 | 701/22 |
| 2014/0209425 A1* | 7/2014 | Tsutsui | F16H 61/14 | 192/55.1 |
| 2015/0329104 A1* | 11/2015 | Takamura | B60K 6/48 | 701/22 |

* cited by examiner

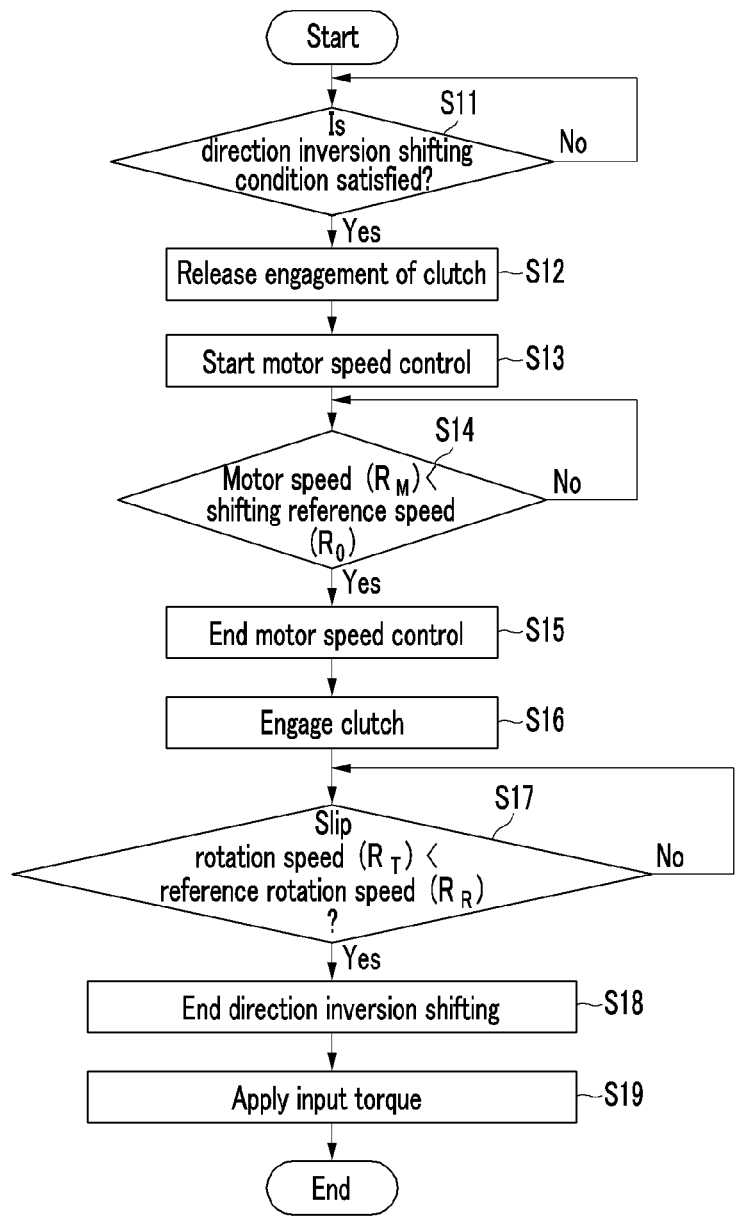

DRIVING SYSTEM FOR VEHICLE AND CONTROLLING METHOD THEREOF

CROSS-REFERENCE TO RELATED APPLICATION

This application claims priority to and the benefit of Korean Patent Application No. 10-2015-0099197 filed in the Korean Intellectual Property Office on Jul. 13, 2015, the entire contents of which are incorporated herein by reference.

BACKGROUND (a) Field of the Invention

The present invention relates to a driving system for a vehicle and a controlling method thereof, and more particularly, to a driving system for a hybrid vehicle and a controlling method thereof.

(b) Description of the Related Art

An electric driving vehicle is a type of vehicle in which a driving motor receives power supplied from a battery and uses the supplied power to produce a driving force of the vehicle. The electric driving vehicle includes an electric vehicle that produces all driving force of the vehicle from the driving motor or a hybrid vehicle that produces some driving force of the vehicle from the driving motor. The hybrid vehicle includes the driving motor configured to generate power by electricity, an engine configured to combust fuel to generate power, and a transmission configured to deliver power from the driving motor and the engine to a driving shaft.

During the existing shifting process, when a reverse driving stage (R-stage) is shifted to a driving stage (D-stage) and the D-stage is shifted to the R-stage, the shifting is performed while a vehicle speed is limited to a predetermined range, for example, a speed of 9 km/h or 10 km/h. As a speed control of the driving motor for shifting during the shifting process is changed based on the vehicle speed, a shifting shock may occur and a driver may feel such a shock during the shifting process.

The above information disclosed in this section is merely for enhancement of understanding of the background of the invention and therefore it may contain information that does not form the prior art that is already known in this country to a person of ordinary skill in the art.

SUMMARY

The present invention provides a driving system for a vehicle and a controlling method thereof capable of more rapidly performing direction inversion shifting and improving a shifting sense.

An exemplary embodiment of the present invention provides a controlling method of a vehicle including an engine, a driving motor connected to the engine, a transmission configured to receive a driving force generated from the engine or the driving motor and change a direction of the driving force, and a clutch that selectively connects between the driving motor and the transmission, the controlling method may include: determining whether a direction inversion shifting condition is satisfied; and when the direction inversion shifting condition is satisfied, performing the direction inversion shifting using the driving motor.

The performing of the direction inversion shifting may include: releasing an engagement of the clutch when the direction inversion shifting condition is satisfied; reducing a speed of the driving motor to a shifting reference speed; and engaging the clutch when the speed of the driving motor is equal to or less than the shifting reference speed. The performing of the direction inversion shifting may further include: comparing a slip rotation speed which is a difference between the speed of the driving motor and a speed of an input shaft of the transmission with a reference rotation speed; and when the slip rotation speed is less than the reference rotation speed, the direction inversion shifting may be terminated.

In the reducing of the speed of the driving motor to the shifting reference speed, a reduction rate of the speed of the driving motor may be determined based on a position of an accelerator pedal. As the position of the accelerator pedal increases (e.g., more pressure is exerted onto the pedal), the absolute value of the reduction rate of the speed of the driving motor may increase. The reducing of the speed of the driving motor to the shifting reference speed may further include: operating the driving motor to generate a driving torque having a negative value.

Additionally, the performing of the direction inversion shifting may include: applying the torque generated from the engine and/or the driving motor to the transmission as an input torque of the transmission when the direction inversion shifting ends. An increase rate of the input torque of the transmission may be determined based on the position of the accelerator pedal. The direction inversion shifting condition may be satisfied when a shifting signal instructing to perform shifting from an R-stage to a D-stage or shifting from the D-stage to the R-stage is input.

Another exemplary embodiment of the present invention provides a driving system for a vehicle, may include: an engine; a driving motor connected to the engine and configured to generate a driving force; a transmission configured to receive a driving force generated from the driving motor and change a direction of the driving force; a clutch configured to selectively connect between the driving motor and the transmission; and a controller configured to operate the driving motor and the transmission. In addition, the controller may be configured to operate the driving motor to perform direction inversion shifting when the direction inversion shifting condition to change the direction of the driving force to the other direction (e.g., a second direction) is satisfied when the transmission delivers the driving force to the driving shaft in one direction (e.g., a first direction).

The controller may be configured to release an engagement of the clutch and reduce a speed of the driving motor to a shifting reference speed when the direction inversion shifting condition is satisfied and engage the clutch when the speed of the driving motor is equal to or less than the shifting reference speed. The controller may further be configured to apply the torque generated from the engine and/or the driving motor to the transmission as an input torque of the transmission when the clutch is engaged. Additionally, the controller may be configured to determine a reduction rate of the speed of the driving motor based on a position of an accelerator pedal when the speed of the driving motor is reduced to the shifting reference speed.

The direction inversion shifting condition may be satisfied when a shifting signal instructing to perform shifting from an R-stage to a D-stage or shifting from the D-stage to the R-stage is input. The controller may then be configured to compare a slip rotation speed which is a difference between the speed of the driving motor and a speed of an input shaft of the transmission with a reference rotation speed and end the direction inversion shifting when the slip rotation speed is less than the reference rotation speed.

According to the controlling method of a vehicle according to an exemplary embodiment of the present invention, the speed of the driving motor may be synchronized with the shifting reference speed for shifting to rapidly perform the shifting control and reduce the shock received by the driver upon the shifting.

BRIEF DESCRIPTION OF THE DRAWINGS

A brief description of each drawing is provided to more sufficiently understand drawings used in the detailed description of the present invention.

FIG. 3 is a flow chart of the controlling method of a vehicle according to an exemplary embodiment of the present invention.

DESCRIPTION OF SYMBOLS

Figure 1:
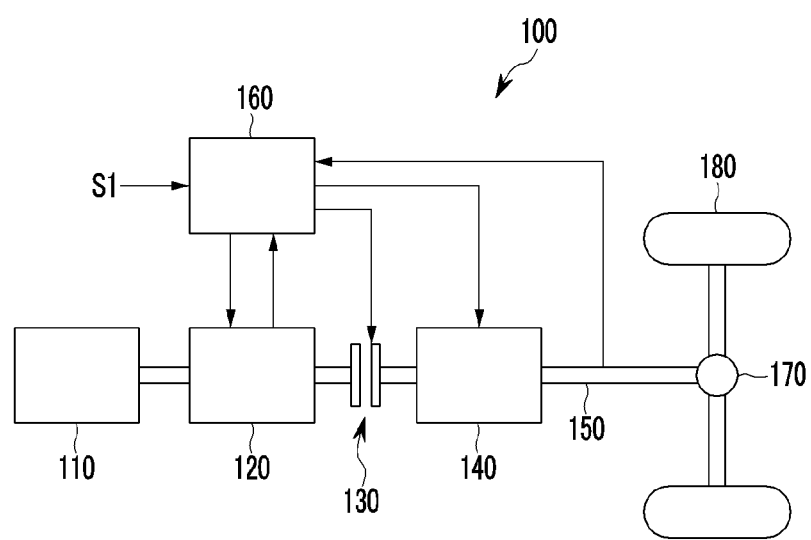
FIG. 1 is a configuration diagram of a driving system for a vehicle according to an exemplary embodiment of the present invention.

100: Driving system
110: Engine
120: Driving motor
130: Clutch
140: Transmission
150: Driving shaft
160: Contoller
170: Differential gear device
180: Wheel

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings so that those skilled in the art to which the present invention pertains may easily practice the present invention. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification. In addition, since sizes and thicknesses of the respective components shown in the accompanying drawings are arbitrarily shown for convenience of explanation, the present invention is not necessarily limited to contents shown in the accompanying drawings.

Hereinafter, a driving system for a vehicle and a controlling method thereof according to an exemplary embodiment of the present invention will be described in detail with reference to the accompanying drawings.

FIG. 1 is a configuration diagram of a driving system for a vehicle according to an exemplary embodiment of the present invention. As illustrated in FIG. 1, a driving system 100 for a vehicle according to an exemplary embodiment of the present invention may include an engine 110, a driving motor 120, a clutch 130, a transmission 140, and a controller 160.

The engine 110 may be connected to the driving motor 120 and a driving force generated from the engine 110 and/or the driving motor 120 may be delivered to a driving shaft 150 via the transmission 140 and a driving force output from the driving shaft 150 may be delivered to a vehicle shaft via a differential gear device 170. The vehicle shaft may be configured to rotate a wheel 180 to drive the vehicle using the driving force generated from the engine 10 and/or the driving motor 20. The clutch 130 may be disposed between the driving motor 120 and the transmission 140 and the clutch 130 may selectively connect between the driving motor 120 and the transmission 140. The clutch 130 may be connected to an input shaft of the transmission 140. When the clutch 130 is engaged, the driving force generated from the engine 110 and/or the driving motor 120 may be delivered to the driving shaft 150 via the transmission 140.

The transmission 140 may include a plurality of gears configured to receive the driving force generated from the engine 110 and the driving motor 120 to rotate the driving shaft 150 in a first direction or a second direction. In other words, the transmission 140 may be configured to change a direction of the driving force input from the engine 110 and the driving motor 120. For example, the transmission 140 may be configured to perform shifting from a reverse driving stage (R-stage) to a driving stage (D-stage) and shifting from the D-stage to the R-stage. The transmission 140 may be a dual-clutch transmission including two clutches.

The controller 160 may be configured to operate the driving motor 120, the clutch 130, and the transmission 140. In particular, the controller 160 may be configured to operate the driving motor 120, the clutch 130, and the transmission 140 to perform the shifting when a shifting signal S1 for inverting a rotating direction of the driving shaft 150, that is, the shifting signal S1 instructing to perform shifting from the R-stage to the D-stage or shifting from the D-stage to the R-stage is input. The shifting signal S1 may be generated by allowing a user to move a gear lever (e.g., a shift lever) from position R to position D or from position D to position R.

In the present specification, the shifting from the R-stage to the D-stage or the shifting from the D-stage to the R-stage may be referred to as direction inversion shifting. In other words, the direction inversion shifting may be configured to change a direction of the driving force to the second direction when the transmission 140 delivers the driving force to the driving shaft 150 in the first direction. The controller 160 may be implemented by at least one microprocessor operated by a predetermined program, in which the predetermined program may include a series of commands for executing each step included in the controlling method of a vehicle according to an exemplary embodiment of the present invention to be described below.

Meanwhile, the driving system 100 according to the present exemplary embodiment may be configured to release the connection between the driving motor 120 and the transmission 140 by the clutch 130 and reduce the speed of the driving motor 120 rotating in a first direction and then engage the clutch 130 to connect between the driving motor 120 and the transmission 140, when the direction inversion shifting is executed, thereby reliving a shifting shock.

Figure 2:
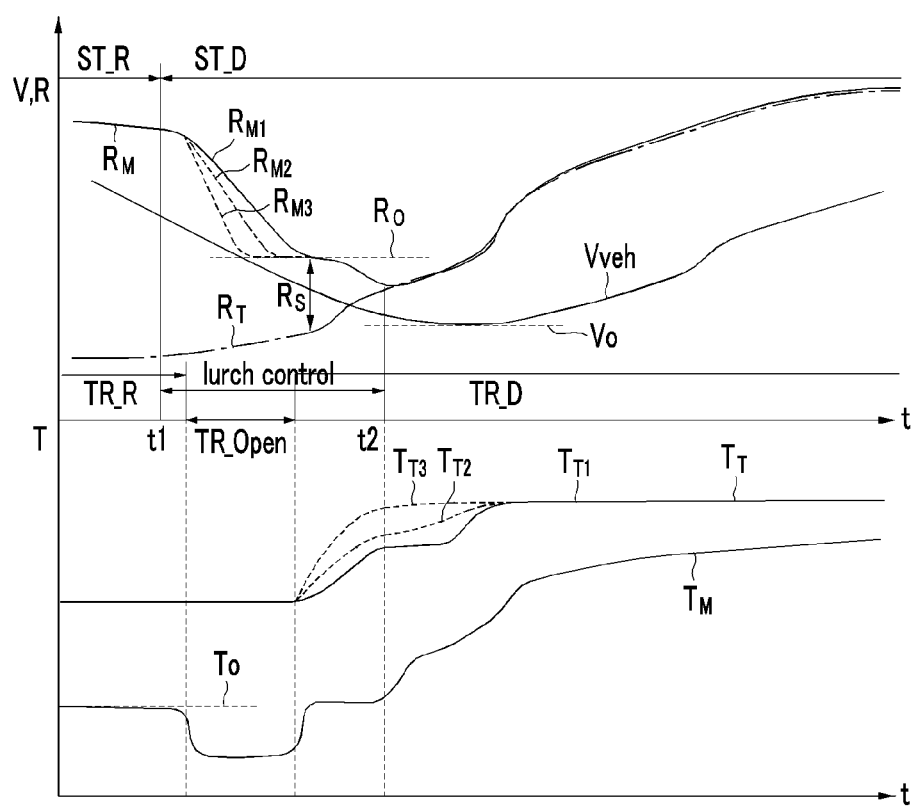
FIG. 2 is a graph illustrating a controlling method of a vehicle according to an exemplary embodiment of the present invention.

Hereinafter, in the driving system 100 according to the exemplary embodiment of the present invention, a process of the direction inversion shifting will be described in detail. FIG. 2 is a graph illustrating a controlling method of a vehicle according to an exemplary embodiment of the present invention. FIG. 2 illustrates a process of changing a shift stage from an R-stage (ST_R) to a D-stage (ST_D). In FIG. 2, an X-axis shows a flow of time and a Y-axis shows a change in a speed V, R and a torque T based on the flow of time.

Referring to FIG. 2, when the direction inversion shifting signal of the vehicle, that is, the shifting signal S1 from the R-stage ST_R to the D-stage ST_D at a first timing t1 is input to the controller 160, the controller 160 may be configured to disconnect the clutch 130 between the driving motor 120 and the transmission 140. In other words, the clutch 130 may be in an opened state. In particular, a predetermined time interval may be formed up to the input of the shifting signal S1 and switching to an opened state TR_Open of the clutch 130. The time interval may indicate a time until the signal is input and then an oil pressure or a voltage may be adjusted and may indicate a prefill time when oil is filled in a channel in the transmission to be adjusted.

Further, the controller 160 may be configured to reduce a speed $R_M$ of the driving motor 120 to a shifting reference speed $R_O$ at which the shifting may be executed from the R-stage to the D-stage. In particular, the controller 160 may be configured to determine a reduction rate of the speed $R_M$ of the driving motor 120 based on a position of the accelerator pedal (that is, an acceleration intention, the amount of pressure exerted onto the pedal, or an engagement degree of the pedal). As the position of the accelerator pedal increases, the absolute value of the reduction rate of the speed $R_M$ of the driving motor 120 may increases. In other words, the controller 160 may be configured to reduce the speed $R_M$ of the driving motor 120 to the shifting reference speed $R_O$ based on different speed diagrams (e.g., $R_{M1}$, $R_{M2}$ and $R_{M3}$).

When the speed $R_M$ of the driving motor 120 is reduced to be equal to or less than the shifting reference speed $R_O$, the controller 160 may be configured to engage the clutch 130 of the opened state TR_Open to connect between the driving motor 120 and the transmission 140. When the driving motor 120 and the transmission 140 are connected to each other, the controller 160 may be configured to compare a slip rotation speed $R_S$ with a reference rotation speed $R_R$ to apply a transmission input torque $T_T$ to the transmission 140 through the driving motor 120 when the slip rotation speed $R_S$ is less than the reference rotation speed $R_R$.

The slip rotation speed $R_S$ may indicate a difference between the speed $R_M$ of the driving motor 120 and a speed $R_T$ of an input shaft of the transmission 140. The speed $R_T$ of the input shaft of the transmission 140 may be calculated by applying a gear ratio of the transmission 140 to the rotation speed of the driving shaft 150. The reference rotation speed $R_R$ may be set to be a value to be determined by those skilled in the art.

The controller 160 may be configured to operate the driving motor 120 to generate the driving torque $T_M$ at which the driving motor 120 has a negative (−) value in a section in which the speed $R_M$ of the driving motor 120 is reduced to the shifting reference speed $R_O$. Further, the controller 160 may be configured to operate the driving motor 120 to generate the driving torque $T_M$ at which the driving motor 120 has a positive (+) value when the clutch 130 is engaged to connect between the driving motor 120 and the transmission 140.

When the clutch 130 is engaged and the driving torque $T_M$ of the driving motor 120 is increased, the input torque $T_T$ of the transmission 140 may also be increased. Particularly, the controller 160 may be configured to determine the increase rate of the input torque $T_T$ of the transmission 140 based on the position of the accelerator pedal. As the position of the accelerator pedal increases, the absolute value of the increase rate of the input torque $T_T$ of the transmission 140 may increase. In other words, the controller 160 may be configured to increase the input torque $T_T$ of the transmission 140 based on different torque diagrams (e.g., $T_{T1}$, $T_{T2}$ and $T_{T3}$). A section from the first timing t1 when the shifting signal S1 is input to the second timing t2 when the slip rotation speed $R_S$ is converged to 0, that is, the timing t2 when the speed $R_M$ of the driving motor 120 is equal to the speed $R_T$ of the input shaft of the transmission 140 may be referred to as a lurch control interval.

Hereinafter, a process of controlling a vehicle according to the present exemplary embodiment will be described in detail. FIG. 3 is a flow chart of the controlling method of a vehicle according to an exemplary embodiment of the present invention. Referring to FIG. 3, the controller 160 may be configured to determine whether the direction inversion shifting condition is satisfied (S11). The direction inversion shifting condition may be satisfied when the shifting signal S1 providing an instruction to perform shifting from the R-stage to the D-stage or shifting from the D-stage to the R-stage is input.

When the direction inversion shifting condition is satisfied, the controller 160 may be configured to operate the driving motor 120 to perform the direction inversion shifting (S12-S21). In particular, when the direction inversion shifting condition is satisfied, the controller 160 may be configured to release the engagement of the clutch 130 (S12). The controller 160 may be configured to start a motor speed control (e.g., speed adjustment) to reduce the speed $R_M$ of the driving motor 120 to the shifting reference speed $R_O$ (S13). In addition, the controller 160 may be configured to determine the reduction rate of the speed $R_M$ of the driving motor 120 based on the position of the accelerator pedal. In particular, the controller 160 may be configured to operate the driving motor 120 to generate the driving torque $T_M$ at which the driving motor 120 has a negative value.

Furthermore, the controller 160 may be configured to compare the speed $R_M$ of the driving motor 120 with the shifting reference speed $R_0$ (S14) and terminate the motor speed control when the speed $R_M$ of the driving motor 120 is equal to or less than the shifting reference speed $R_0$ (S15). The controller 160 may then be configured to engage the clutch 130 to connect between the driving motor 120 and the transmission (S16). The controller 160 may further be configured to determine whether the slip rotation speed $R_S$ that is a difference between the speed $R_M$ of the driving motor 120 and the speed $R_T$ of the input shaft of the transmission 140 is less than the reference rotation speed $R_R$ (S17).

In response to determining that the slip rotation speed $R_T$ is less than the reference rotation speed $R_R$, the controller 160 may be configured to determine that the speed $R_M$ of the driving motor 120 is synchronized with the speed $R_T$ of the input shaft of the transmission 140 to terminate or complete the direction inversion shifting (S18) and the torque generated from the engine 10 and/or driving motor 20 may be applied as the input torque $T_T$ of the transmission 140 (S19). In particular, the controller 160 may be configured to determine the increase rate of the input torque $T_T$ of the transmission 140 based on the position of the accelerator pedal.

The present embodiment exemplarily describes the process of shifting the transmission from the R-stage to the D-stage but even when the transmission is shifted from the D-stage to the R-stage, the present exemplary embodiment may be applied. According to the proposed exemplary embodiment, as the speed of the driving motor is synchronized with the shifting reference speed for shifting, it may be possible to rapidly perform the shifting control and reduce the uneven or unsteady feeling upon the shifting such as the shifting shock.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A controlling method of a vehicle including an engine, a driving motor connected to the engine, a transmission receiving a driving force generated from the engine or the driving motor and changing a direction of the driving force, and a clutch selectively connecting between the driving motor and the transmission, the controlling method comprising:
   determining, by a controller, whether a shifting instructing to perform shifting from a reverse stage to a drive stage or shifting from the drive stage to the reverse stage is input;
   performing, by the controller, shifting from the reverse stage to the drive stage or shifting from the drive stage to the reverse stage when a shifting signal is input,
   wherein the performing of the shifting from the reverse stage to the drive stage or the shifting from the drive stage to the reverse stage includes:
     releasing, by the controller, an engagement of the clutch when the shifting signal is input;
     reducing, by the controller, a speed of the driving motor to a shifting reference speed; and
     engaging, by the controller, the clutch when the speed of the driving motor is equal to or less than the shifting reference speed.

2. The controlling method of a vehicle of claim 1, wherein the performing of the direction inversion shifting further includes:
   comparing, by the controller, a slip rotation speed with a reference rotation speed; and
   terminating, by the controller, the direction inversion shifting when the slip rotation speed is less than the reference rotation speed,
   wherein the slip rotation speed is a different between the speed of the driving motor and a speed of an input shaft of the transmission.

3. The controlling method of a vehicle of claim 1, wherein in the reducing of the speed of the driving motor to the shifting reference speed, a reduction rate of the speed of the driving motor is determined based on a position of an accelerator pedal.

4. The controlling method of a vehicle of claim 3, wherein as the position of the accelerator pedal increases, the absolute value of the reduction rate of the speed of the driving motor is increased.

5. The controlling method of a vehicle of claim 1, wherein the reducing of the speed of the driving motor to the shifting reference speed includes:
   operating, by the controller, the driving motor to generate a driving torque having a negative value.

6. The controlling method of a vehicle of claim 2, wherein the performing of the direction inversion shifting further includes:
   when the direction inversion shifting ends, applying, by the controller, a torque generated from the engine and/or the driving motor to the transmission as an input torque of the transmission.

7. The controlling method of a vehicle of claim 6, wherein an increase rate of the input torque of the transmission is determined based on a position of an accelerator pedal.

8. A driving system for a vehicle, comprising:
   an engine;
   a driving motor connected to the engine and configured to generate a driving force;
   a transmission configured to receive the driving force generated from the driving motor and change a direction of the driving force;
   a clutch selectively connecting between the driving motor and the transmission; and
   a controller configured to operate the driving motor and the transmission,
   wherein the controller is configured to:
     determine whether a shifting signal instruction to perform shifting from a reverse stage to a drive stage or shifting from the drive stage to the reverse stage is input;
     perform shifting from the reverse stage to the drive stage or shitting from the drive stage to the reverse stage when the shifting signal is input;
     release an engagement of the clutch when the shifting signal is input;
     reduce a speed of the driving motor to a shifting reference speed; and
     engage the clutch when the steed of the driving motor is equal to or less than the shifting reference speed.

9. The driving system for a vehicle of claim 8, wherein the controller is configured to apply a torque generated from the engine and/or the driving motor to the transmission as an input torque of the transmission when the clutch is engaged.

10. The driving system for a vehicle of claim 8, wherein the controller is configured to determine a reduction rate of the speed of the driving motor based on a position of an accelerator pedal when the speed of the driving motor is reduced to the shifting reference speed.

11. The driving system for a vehicle of claim 8, wherein the controller is configured to compare a slip rotation speed with a reference rotation speed and terminate the direction inversion shifting when the slip rotation speed is less than the reference rotation speed.

12. The driving system for a vehicle of claim 11, wherein the slip rotation speed is a difference between the speed of the driving motor and a speed of an input shaft of the transmission.

* * * * *